United States Patent
Zhou

(10) Patent No.: US 8,693,873 B2
(45) Date of Patent: Apr. 8, 2014

(54) APPARATUS AND METHOD FOR IMPROVED DISTRIBUTED COMPENSATION OF FILTERING EFFECTS MITIGATION IN AN OPTICAL NETWORK

(75) Inventor: Xiang Zhou, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 73 days.

(21) Appl. No.: 13/310,323

(22) Filed: Dec. 2, 2011

(65) Prior Publication Data

US 2013/0142510 A1     Jun. 6, 2013

(51) Int. Cl.
| | |
|---|---|
| H04J 14/02 | (2006.01) |
| H04B 17/00 | (2006.01) |
| G02F 1/09 | (2006.01) |
| G02B 27/42 | (2006.01) |
| G02B 6/28 | (2006.01) |
| G02B 6/42 | (2006.01) |
| G02B 6/34 | (2006.01) |

(52) U.S. Cl.
USPC ........... 398/83; 398/79; 398/85; 398/34; 359/283; 359/282; 359/558; 385/24; 385/25; 385/37

(58) Field of Classification Search
USPC .......... 398/83, 79, 85, 37; 359/283, 282, 558; 385/24, 25, 37
See application file for complete search history.

(56) References Cited

U.S. PATENT DOCUMENTS

| | | | |
|---|---|---|---|
| 6,449,402 B1 * | 9/2002 | Bettman et al. ............. 385/15 |
| 7,248,695 B1 * | 7/2007 | Beal et al. ................. 380/256 |
| 7,907,844 B2 * | 3/2011 | Levner et al. ............... 398/82 |
| 8,064,768 B2 * | 11/2011 | Ji et al. ...................... 398/80 |
| 2002/0172458 A1 * | 11/2002 | Downie ........................ 385/31 |
| 2003/0215239 A1 * | 11/2003 | Joo et al. ..................... 398/83 |
| 2004/0151426 A1 * | 8/2004 | Boertjes et al. ............. 385/24 |
| 2005/0281295 A1 * | 12/2005 | Fishman et al. ........... 370/535 |
| 2006/0034610 A1 * | 2/2006 | Akiyama et al. ............ 398/83 |
| 2006/0062577 A1 * | 3/2006 | Miura et al. ................. 398/82 |
| 2008/0260394 A1 * | 10/2008 | Ereifej ........................ 398/159 |
| 2009/0162066 A1 * | 6/2009 | Ji et al. ....................... 398/79 |
| 2009/0226168 A1 * | 9/2009 | Boduch ....................... 398/48 |
| 2009/0226173 A1 * | 9/2009 | Yano et al. .................. 398/85 |
| 2010/0329686 A1 * | 12/2010 | Frankel ....................... 398/83 |
| 2011/0038636 A1 * | 2/2011 | Akiyama et al. ............ 398/85 |
| 2011/0135301 A1 * | 6/2011 | Myslinski et al. .......... 398/34 |

OTHER PUBLICATIONS

Wikipedia; Reconfigurable Optical Add-Drop Multiplexer; http://en.wikipedia.org/wiki/Reconfigurable_optical_add-drop_multiplexer; downloaded Oct. 11, 2011; p. 1.

(Continued)

*Primary Examiner* — Ken Vanderpuye
*Assistant Examiner* — Abbas H Alagheband
(74) *Attorney, Agent, or Firm* — Wolff & Samson, PC

(57) ABSTRACT

The present disclosure describes a reconfigurable optical add-drop multiplexer. The reconfigurable optical add-drop multiplexer includes a first optical equalizer to precompensate a received optical signal for optical filtering effects to produce a first compensated optical signal. A first interleaver, coupled to the first optical equalizer, separates the first compensated optical signal into an odd optical signal and an even optical signal. A plurality of wavelength selective switches processes the odd optical signal and the even optical signal. A second interleaver, combines the odd optical signal and the even optical signal to produce a combined optical signal. A second optical equalizer, coupled to the second interleaver, postcompensates the combined optical signal for optical filtering effects to produce an output optical signal.

12 Claims, 10 Drawing Sheets

(56) References Cited

OTHER PUBLICATIONS

Wikipedia; Optical Add-Drop Multiplexer; http://en.wikipedia.org/wiki/Optical_add-drop_multiplexer; downloaded Oct. 11, 2011; p. 1-2.

Searchtelecom Techtarget; ROADM (Reconfigurable Optical Add-Drop Multiplexer); http://searchtelecom.techtarget.com/definition/ROADM-reconfigurable-optical-add-drop-multiplexer; downloaded Oct. 11, 2011; pp. 1-3.

Infocellar; ROADM Reconfigurable Optical ADM (Add-Drop Multiplexers); http://www.infocellar.com/networks/new-tech/ROADM/ROADM.htm; downloaded Oct. 11, 2011; pp. 1-4.

\* cited by examiner

US 8,693,873 B2

APPARATUS AND METHOD FOR IMPROVED DISTRIBUTED COMPENSATION OF FILTERING EFFECTS MITIGATION IN AN OPTICAL NETWORK

FIELD

The present application relates to using reconfigurable optical add/drop multiplexers (ROADMs) to route optical wavelengths of optical signals.

BACKGROUND

Optical networks using ROADMs for routing optical wavelengths are becoming increasingly prevalent resulting from the need for lower costs, greater flexibility between data formats, and efficient capacity upgrades. In optical networks, the achievable spectral efficiency (SE) and overall fiber capacity are limited by noise from optical amplifiers and fiber nonlinearity. The SE and overall fiber capacity are also limited by channel bandwidth narrowing caused by the usage of wavelength selective devices or wavelength selective switches (WSS), which are components of ROADMs.

For example, in 50 GHz-spaced 40-Gb/s and 100-GB/s wavelength-division-multiplexed (WDM) systems, channel bandwidth narrowing effects are managed by using digital coherent detection and bandwidth improvement of wavelength selective devices. However, even with combined use of digital coherent detection and improved flat-top wavelength selective devices, the usable bandwidth for a typical long-haul optical network is still limited to 30-40 Ghz for a 50 Ghz-spaced WDM system.

Usable bandwidth reduces as the number of cascaded ROADMs increases. As an example, if there are 20 cascaded ROADMs, the usable bandwidth is typically limited to about 30 GHz. Although this channel bandwidth supports 100 Gb/s systems over 50 GHz WDM grid by using polarization-multiplexed (PM) quadrature phase shift keying (QPSK) modulation, it is not wide enough to support future 400 Gb/s and beyond systems operating at higher spectral efficiency by using high-order quadrature amplitude modulation (QAM) based modulation formats.

Improvements to spectral utilization in WDM systems have been proposed. A first method is based on the concept of using a super channel where the channel grid is increased in order to reduce the portion of channel guard bands to improve spectral utilization. However, usage of the super channel reduces channel granularity, and thus reduces network efficiency and flexibility. A second method is based on using transmitter side pre-equalization, where the spectral shape of a transmitted signal is pre-emphasized in order to combat cascaded optical filtering along optical links. However, because the narrow optical filtering effects occur in a distributed way along each optical link, the pre-equalized signal will have a higher launch power and as a result experience more nonlinear impairments. A third method utilized advanced post equalization techniques such as maximum likelihood sequence equalization (MLSE) to perform post-transmission equalization of filtering effects. However, this method does not perform well when the signal-to-noise ratio is low, which is typical for high-speed systems using advanced feed-forward error correction coding.

SUMMARY

The present disclosure describes a reconfigurable optical add-drop multiplexer in accordance with an embodiment of the present disclosure. A first optical equalizer, coupled to an input, precompensates a received optical signal for optical filtering effects to produce a first compensated optical signal. A first interleaver, coupled to the first optical equalizer, separates the first compensated optical signal into a first odd optical signal and a first even optical signal. A first odd wavelength selective switch, coupled to the first interleaver, receives the first odd optical signal and generates a second odd optical signal. A first even wavelength selective switch, coupled to the first interleaver, receives the first even optical signal and generates a second even optical signal. A second odd wavelength selective switch, coupled to the first odd wavelength selective switch, receives the second odd optical signal from the first odd wavelength selective switch and generates a third odd optical signal. A second even wavelength selective switch, coupled to the first even wavelength selective switch, receives the second even optical signal from the first even wavelength selective switch and generates a third even optical signal. A second interleaver, coupled to the second odd wavelength selective switch and the second even wavelength selective switch, combines the third odd optical signal and the third even optical signal to produce a combined optical signal. A second optical equalizer, coupled to the second interleaver, postcompensates the combined optical signal for optical filtering effects to produce an output optical signal.

In an embodiment, the first optical equalizer precompensates for optical filtering effects caused by the first interleaver. The second optical equalizer postcompensates for optical filtering effects caused by the second interleaver.

In an embodiment, the first interleaver is a 50/100 GHz 1×2 interleaver that separates the first compensated optical signal into two 100 GHz spaced wavelength division multiplexing signals representing the first odd optical signal and the first even optical signal. The second interleaver is a 50/100 GHz 1×2 interleaver that combines the third odd optical signal and the third even optical signal into a 50 GHz spaced wavelength division multiplexing signal.

In an embodiment, the first odd wavelength selective switch has a 50 GHz offset at an odd passband center to receive the odd optical signal and the first even wavelength selective switch has a 50 GHz offset at an even passband center to receive the even optical signal.

In an embodiment, the first optical equalizer and the second optical equalizer are each a Fabry-Perot type comb filter.

In an embodiment, each wavelength selective switch includes an add port to receive optical signal wavelengths, a drop port to drop optical signal wavelengths, and a through port to transmit an optical signal through the reconfigurable optical add-drop multiplexer.

In an embodiment, a method for compensating for optical filtering effects includes precompensating an optical signal for optical filtering effects to produce a compensated optical signal. The compensated signal is separated into a first odd optical signal and a first even optical signal. The first odd optical signal is filtered to produce a second odd optical signal. The first even optical signal is filtered to produce a second even optical signal. The second odd optical signal and the second even optical signal are combined to produce a combined optical signal. The combined optical signal is post-compensated for optical filtering effects to produce an output optical signal.

In an embodiment, filtering the first odd optical signal to produce a second odd optical signal comprises filtering optical wavelengths added to the first odd optical signal and optical wavelengths dropped from the first odd optical signal to produce a filtered odd optical signal.

In an embodiment, filtering the first even optical signal to produce a second even optical signal comprises filtering optical wavelengths added to the first even optical signal and optical wavelengths dropped from the first even optical signal to produce a filtered even optical signal.

In an embodiment, precompensating an optical signal for optical filtering effects to produce a compensated optical signal includes preequalizing the optical signal to remove optical filtering effects caused by a first interleaver and associated wavelength selective switches.

In an embodiment, the compensated signal is a 50 GHz spaced wavelength division multiplexing signal. Separating the compensated signal into a first odd optical signal and a first even optical signal includes generating an odd 100 GHz-spaced wavelength division multiplexing signal representing odd wavelength division multiplexing channels; and generating an even 100 GHz-spaced wavelength division multiplexing signal representing even wavelength division multiplexing channels.

In an embodiment, combining the second odd optical signal and the second even optical signal to produce a combined optical signal includes combining an odd 100 GHz-spaced wavelength division multiplexing signal representing odd wavelength division multiplexing channels and an even 100 GHz-spaced wavelength division multiplexing signal representing even wavelength division multiplexing channels to produce a combined 50 GHz spaced wavelength division multiplexing signal.

In an embodiment, postcompensating the combined optical signal for optical filtering effects to produce an output optical signal includes postequalizing the combined optical signal to remove optical filtering effects caused by a second interleaver and associated wavelength selective switches.

In an embodiment, a reconfigurable optical add-drop multiplexer includes a power splitter. The power splitter, coupled to an input, receives an optical signal and split the optical signal into a first optical signal and a second optical signal. An odd wavelength selective switch (with the odd wavelengths at the center of the passband), coupled to the power splitter, filters out even wavelengths of the first optical signal to produce an odd optical signal. An even wavelength selective switch (with the even wavelengths at the center of the passband), coupled to the power splitter, filters out odd wavelengths of the second optical signal to produce an even optical signal. An interleaver, coupled to the odd wavelength selective switch and the even wavelength selective switch, combines the odd optical signal and the even optical signal into a combined optical signal. The optical equalizer, coupled to the interleaver, compensates for optical filtering effects to produce an output optical signal.

In an embodiment, the odd wavelength selective switch is a 50 GHz offset at an odd passband center to filter the odd wavelengths of the first optical signal to produce the odd optical signal. The first even wavelength selective switch is a 50 HGz offset at an even passband center to filter the even wavelengths of the second optical signal to produce an even optical signal.

In an embodiment, the first optical signal and the second optical signal each represents an identical copy of the optical signal.

In an embodiment, the interleaver is a 50/100 GHz 1×2 interleaver that combines the odd optical signal and the even optical signal into a 50 GHz-spaced wavelength division multiplexing signal.

In an embodiment, the optical equalizer postcompensates for optical filtering effects caused by the interleaver and optical filtering effects caused by the odd wavelength selective switch and the even wavelength selective switch.

These and other advantages of the present disclosure will be apparent to those of ordinary skill in the art by reference to the following detailed description and the accompanying drawings.

DETAILED DESCRIPTION

The method and apparatus described herein addresses the channel narrowing problem described above. Narrow optical filtering effects caused by wavelength selective devices, such as wavelength selective switches (WSS), inside a ROADM, may be mitigated.

A distributed optical filtering effects compensation method and apparatus addresses channel narrowing. An achievable spectral efficiency (SE) is maximized in order to improve transport economics. The introduction of an optical equalizer before a WSS pre-equalizes the amplitude of an optical signal received at a ROADM. Alternatively, an optical equalizer may be placed after a WSS to perform post-filtering equalization of an optical signal that has been filtered by a ROADM. The aforementioned optical equalizers may be integrated into a ROADM in an optical network in order to perform distributed optical filtering effects compensation. As a result, the effective channel bandwidth in an optical network can be improved significantly while only introducing minimal nonlinear penalty. Any extra noise penalty caused by the optical equalizers themselves can be managed and minimized through optical amplification.

The aforementioned distributed optical filtering effects compensation method and apparatus may be further improved by the embodiments described herein. A different wavelength switching architecture can be employed within a ROADM in accordance with the embodiments described herein. The switching architecture facilitates the usage of Fabry-Perot comb filters as static optical equalizers which perform distributed filtering effects compensation within a ROADM.

Figure 1:
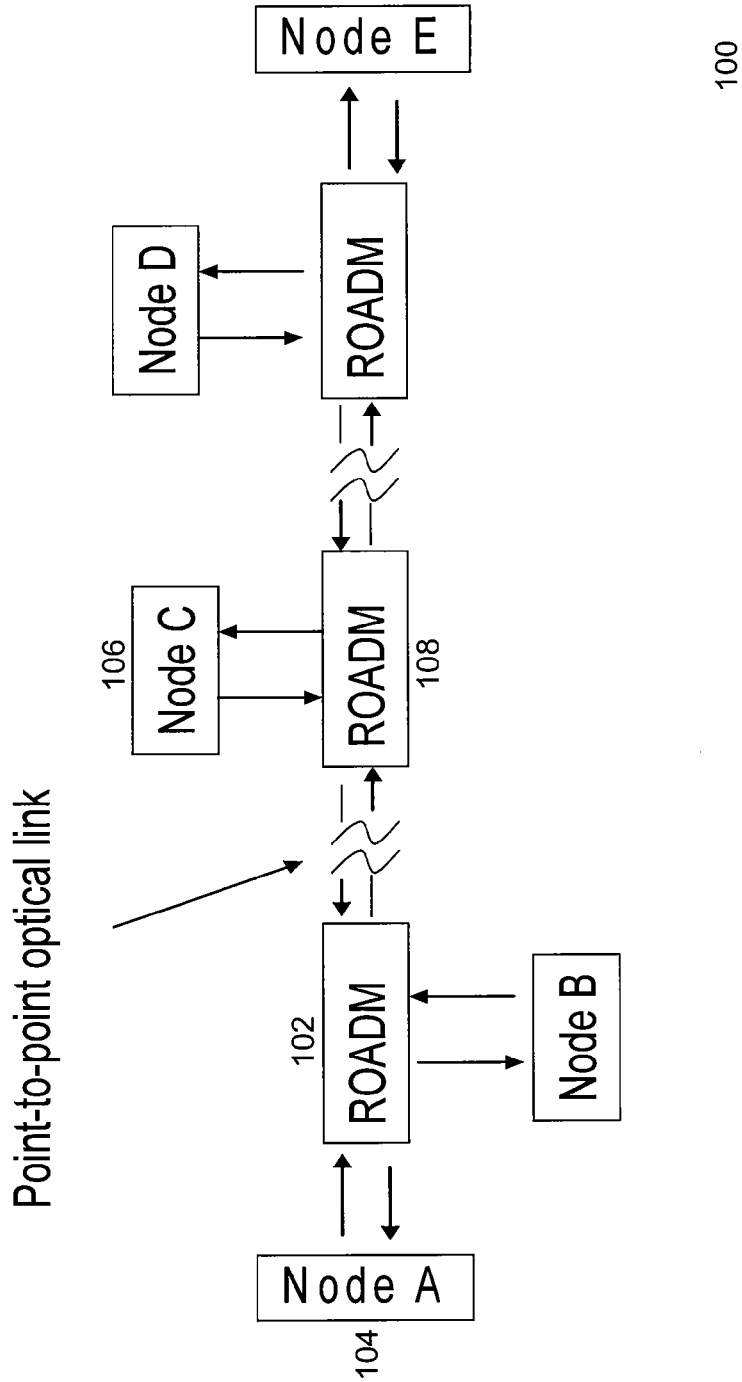
FIG. 1 illustrates an exemplary wavelength-routing optical network.

FIG. 1 illustrates an exemplary wavelength-routing optical network 100. Optical signals may pass from one node to another node through ROADMs via optical links. For example, an optical signal from Node A 104 is transmitted to Node C 106 via ROADM 102 and ROADM 108. Each ROADM includes at least one WSS that is used for filtering wavelengths from the optical signals.

Figure 2:
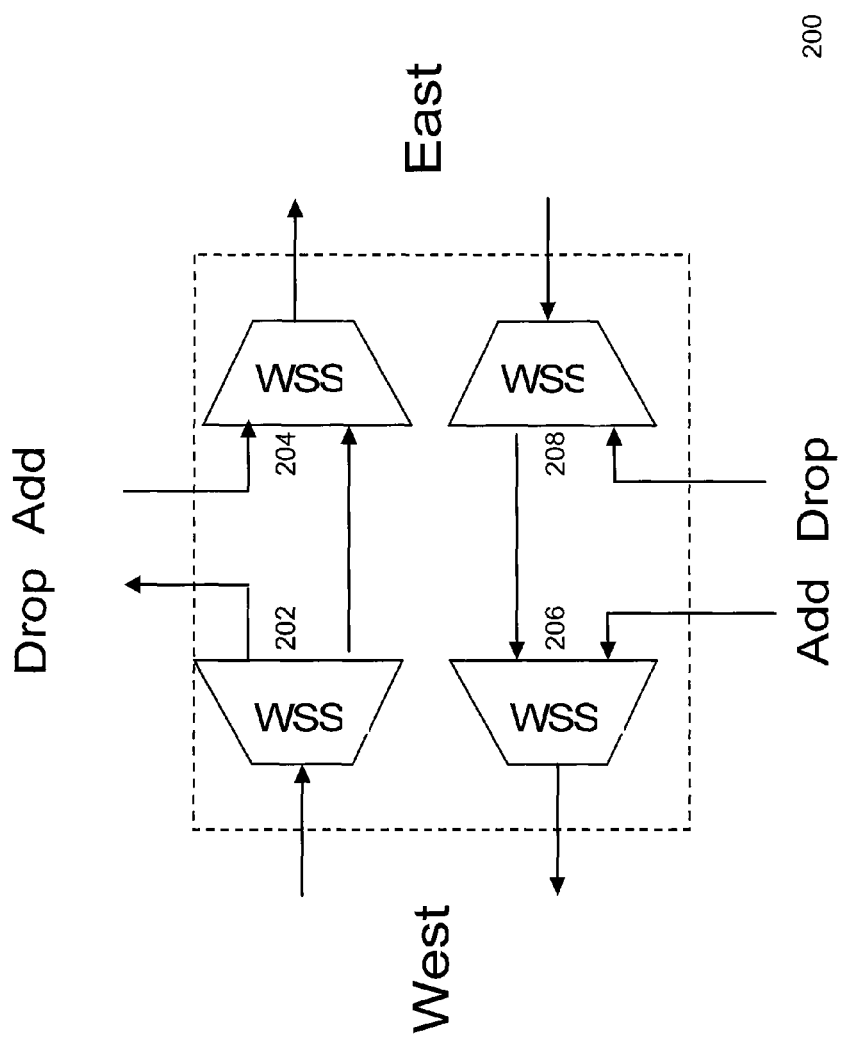
FIG. 2 illustrates an exemplary ROADM.

FIG. 2 illustrates an exemplary ROADM 200. ROADM 200 includes four WSS' 202, 204, 206, and 208. WSS' 202 and 204 propagate optical signals in a first direction. WSS' 206 and 208 propagate signals in a second direction. Each WSS is an optical spectrometer including a switching engine element at the back end. The switching engine element may be based on binary liquid crystals (LC), liquid crystal on silicon (LCoS), or micorelectricalmechanical (MEMs). The spectral shape of any WSS is determined based on the spectral resolution of the ROADM. The spectral resolution can be expressed as a ratio of the distance between the center of adjacent channel switching engine elements in each WSS to a beam spot radius measured at the channel switching engine element. Due to physical size and cost constraints, the 0.5 dB bandwidth of a 50 GHz-grid WSS is typically limited to 30-40 GHz.

Figure 3A:
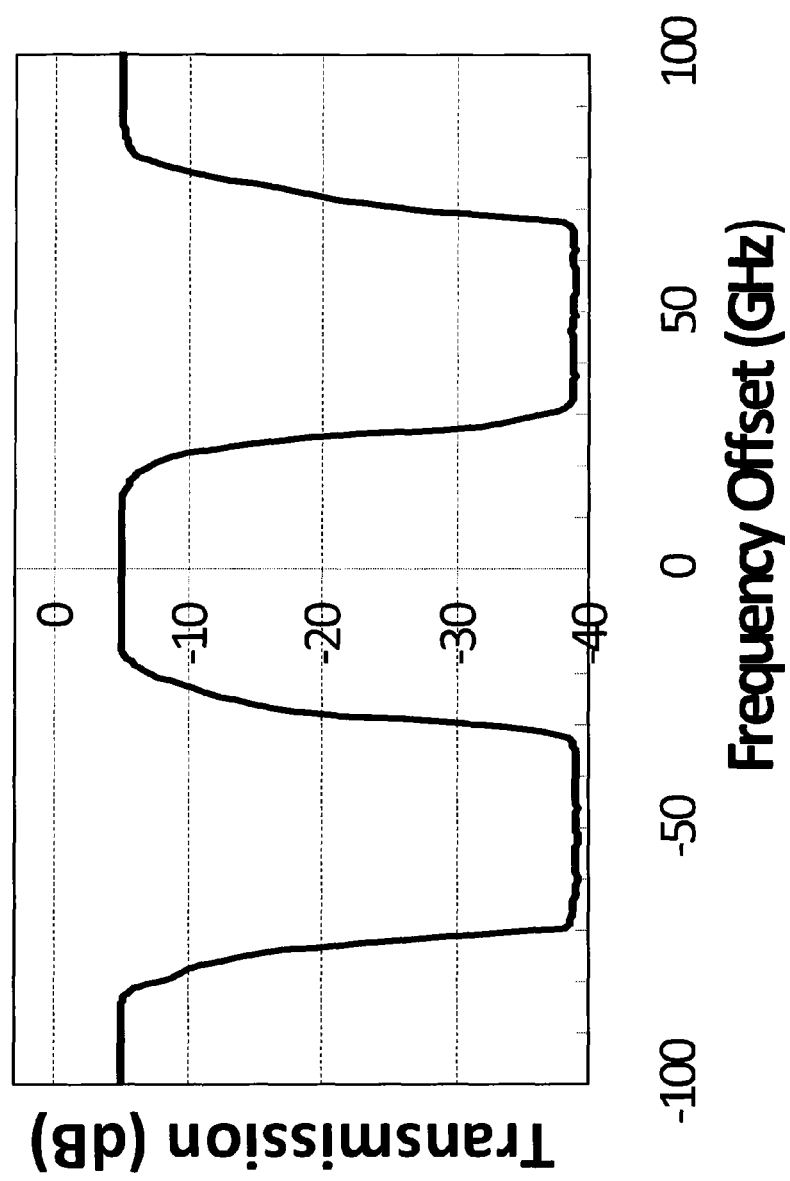
FIG. 3A illustrates a measured power transfer function of a single WSS.

FIG. 3A illustrates a measured power transfer function of a single WSS. Specifically, FIG. 3A illustrates a measured power transfer function for a typical 50 GHz-grid WSS using a binary LC based switching engine element. The 0.5 dB and 3 dB bandwidth is shown by the transfer function as being 33 GHz and 42 GHz, respectively.

Figure 3B:
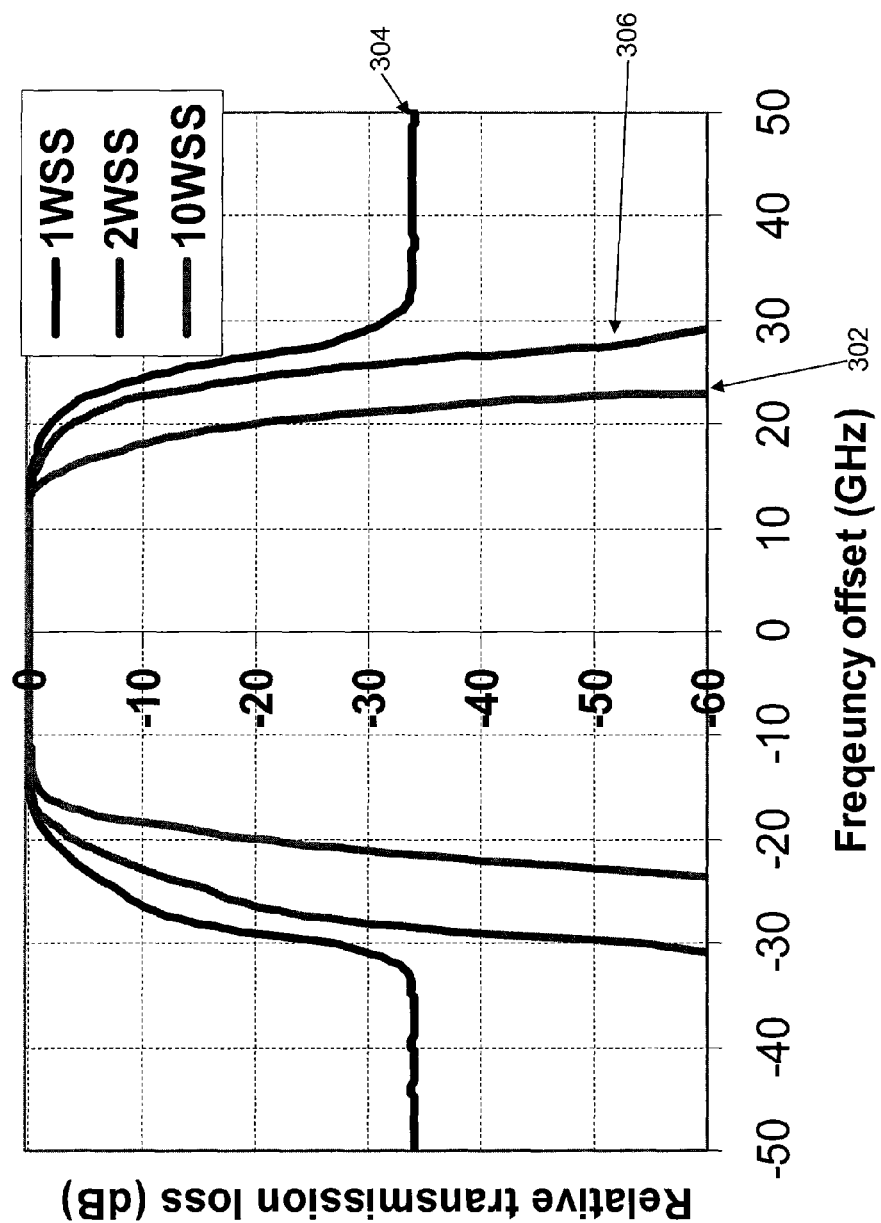
FIG. 3B illustrates a measured power transfer function of a single WSS, two WSS', and a cascade of 10 WSS'.

FIG. 3B illustrates a measured power transfer function of a single WSS, two WSS', and a cascade of 10 WSS'. FIG. 3B illustrates a measured power transfer function 302 for a typical 50 GHz-grid cascade of 10 WSS' using binary LC based switching engine elements. The 0.5 dB and 3 dB bandwidth is shown by the transfer function as being 28 GHz and 31.5 GHz, respectively. FIG. 3B also illustrates a measured power function 304 for a 50 GHz-grid single WSS and measured power function 306 for a 50 GHz-grid two WSS cascade.

Figure 4A:
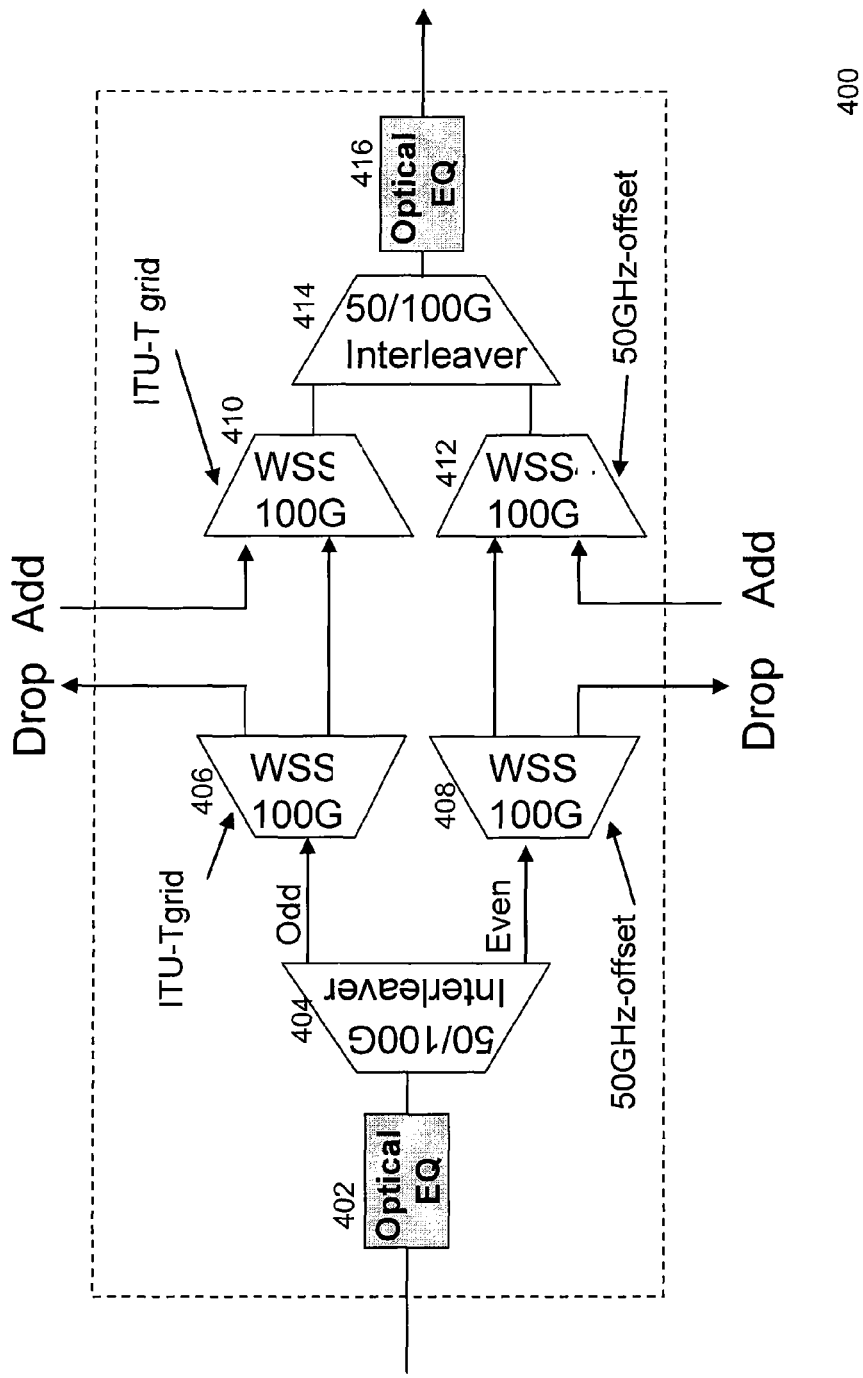
FIG. 4A illustrates an exemplary select-and-switch ROADM based on an odd/even wavelength switching architecture.

FIG. 4A illustrates an exemplary select-and-switch ROADM 400 based on an odd/even wavelength switching architecture. ROADM 400 includes an optical equalizer 402 which receives from an input of ROADM 4000, an optical signal. Optical equalizer 402 precompensates for optical filtering effects caused by interleaver 404, and WSS' 406 and 408, to produce a compensated optical signal. Precompensation of optical filtering effects entails equalizing the optical signal to mitigate optical filtering effects caused by interleaver 404 and WSS' 406 and 408. As a result, there is no need to increase the power launching of the optical signal into an optical fiber and thus there is no introduction of any additional nonlinear penalty. Optical equalizer 402 may be, for example, a Fabry-Perot type comb filter.

Interleaver 404 separates the compensated optical signal into an odd optical signal and even optical signal. For example, a 50 GHz-spaced wavelength division multiplexing (WDM) signal received at interleaver 404 from optical equalizer 402 is separated into two 100 GHz-spaced WDM signals. One of these signals is the odd optical signal and the other is the even optical signal. The odd optical signal includes odd WDM channels and the even optical signal includes even WDM channels.

The odd optical signal is transmitted from interleaver 404 to WSS 406 and the even optical signal is transmitted from interleaver 404 to WSS 408. In the odd/even wavelength switching architecture shown in ROADM 400, the odd optical signal and the even optical signal each has a dedicated WSS that facilitates separate switching or filtering of odd WDM signals and even WDM signals. Each of WSS 406 and 408 has a switching passband twice as wide as the WDM channel spacing. WSS 406 and 408 also have a frequency offset equal to the WDM channel spacing such that both odd and even WDM signals may be aligned to the center of the switching passband. With the odd/even wavelength switching architecture, WDM optical signals will experience negligible filtering effects from the WSS'. Instead, the optical filtering effects are shifted from WSS 406 and 408 to interleaver 404. As discussed, optical equalizer 402 mitigates the optical filtering effects at interleaver 404.

For example, interleaver 404 may be a 50/100 GHz 1×2 interleaver that separates 50 GHz-spaced WDM signals into two 100 GHz-spaced WDM signals, an odd optical signal and an even optical signal. The odd optical signal is transmitted to WSS 406, a 100 GHz-grid WSS, while the even optical signal is transmitted to WSS 408, a 100 GHz-grid WSS. The passbands of both WSS 406 and 408 is designed with a 50 GHz offset such that odd wavelengths are at the passband center of WSS 406 and even wavelengths are at the passband center of WSS 408. Since the switching passband bandwidth is twice as large as the WDM channel spacing, there are negligible filtering effects from WSS' 406 and 408.

Each WSS includes an add port to receive optical signal wavelengths, a drop port to drop optical signal wavelengths, and a through port to transmit an optical signal through a ROADM. The odd optical signal and the even optical signal are transmitted through the ROADM where certain optical wavelengths may be added or dropped from the WSS'.

ROADM 400 also includes additional WSS' 410 and 412, which receive the odd optical signal and the even optical signal from WSS' 406 and 408, respectively. WSS' 410 and 412 facilitate further filtering of the odd optical signal and the even optical signal along a propagation direction. WSS 410 and 412 may have characteristics similar or identical to those of WSS' 406 and 408 described above.

The odd optical signal and the even optical signal are then combined by interleaver 414. Interleaver 414 may have similar or identical characteristics to interleaver 404, described above. While interleaver 404 facilitates splitting of an optical signal into an odd optical signal and an even optical signal, interleaver 414 instead facilitates combining the odd optical signal and the even optical signal to produce a combined optical signal. Thus, for example, interleaver 414 combines two 100 GHz-spaced WDM signals, one being an odd optical signal and one being an even optical signal, into a single 50 GHz-spaced WDM signal.

The combined signal is transmitted to optical equalizer 416. Optical equalizer 416 facilitates postcompensation of optical filtering effects caused by interleaver 414 and WSS' 410 and 412. Postcompensation, like precompensation, entails equalizing an optical signal to mitigate optical filtering effects. Optical equalizer 416 may also have characteristics similar or identical to those of optical equalizer 402 described above.

Thus, for the select-and-switch based ROADM 400, two 1×2 interleavers 404 and 414 are needed for a given propagation direction (one for odd/even signal separation and one for odd/even signal combination). Therefore, two comb filter based optical equalizers 402 and 416 are required in order to compensate for the optical filtering effects of interleavers 404 and 414, respectively, as well as their associated WSS'.

Figure 4B:
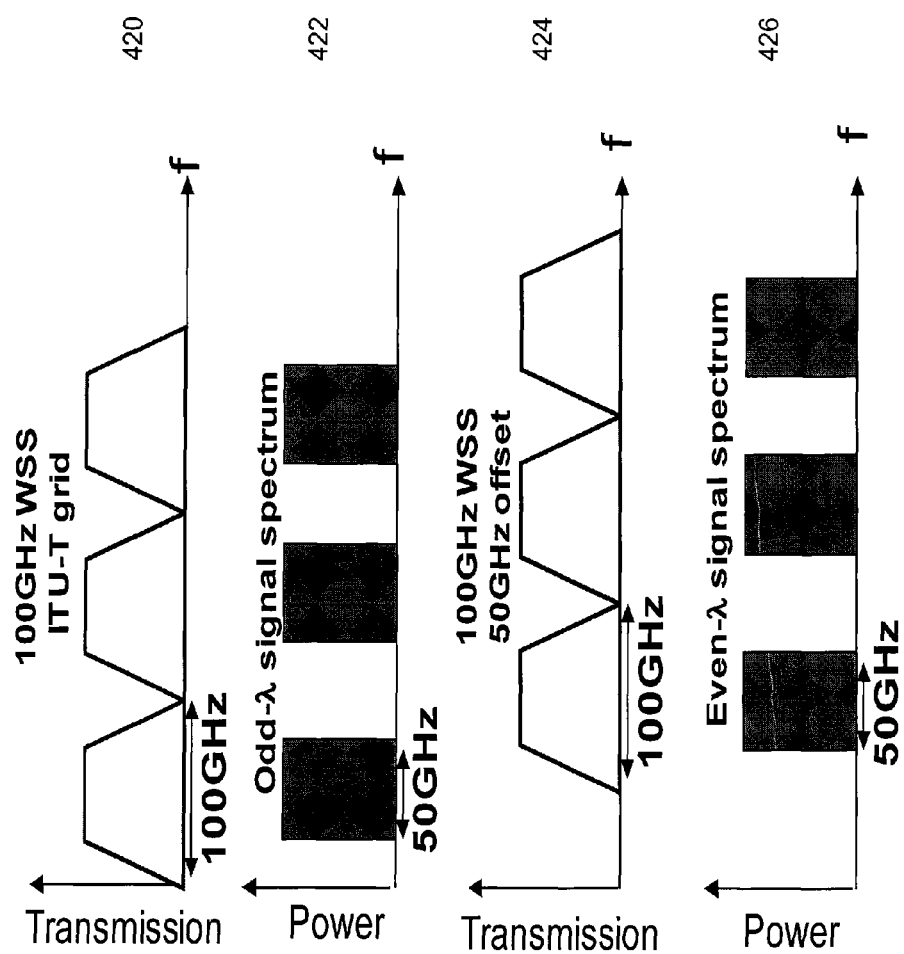
FIG. 4B illustrates WSS transmission and signal spectra in accordance with an embodiment of the present disclosure.

FIG. 4B illustrates WSS transmission and signal spectra in accordance with an embodiment of the present disclosure. Graph 420 illustrates the transmission spectra of an odd optical signal WSS, for example, WSS 406, that receives odd optical signals. Graph 422 illustrates the signal spectra of the aforementioned odd optical signal WSS. Graph 424 illustrates the transmission spectra of an even optical signal WSS, for example, WSS 408, that receives even optical signals. Graph 426 illustrates the signal spectra of the aforementioned even optical signal WSS.

Figure 4C:
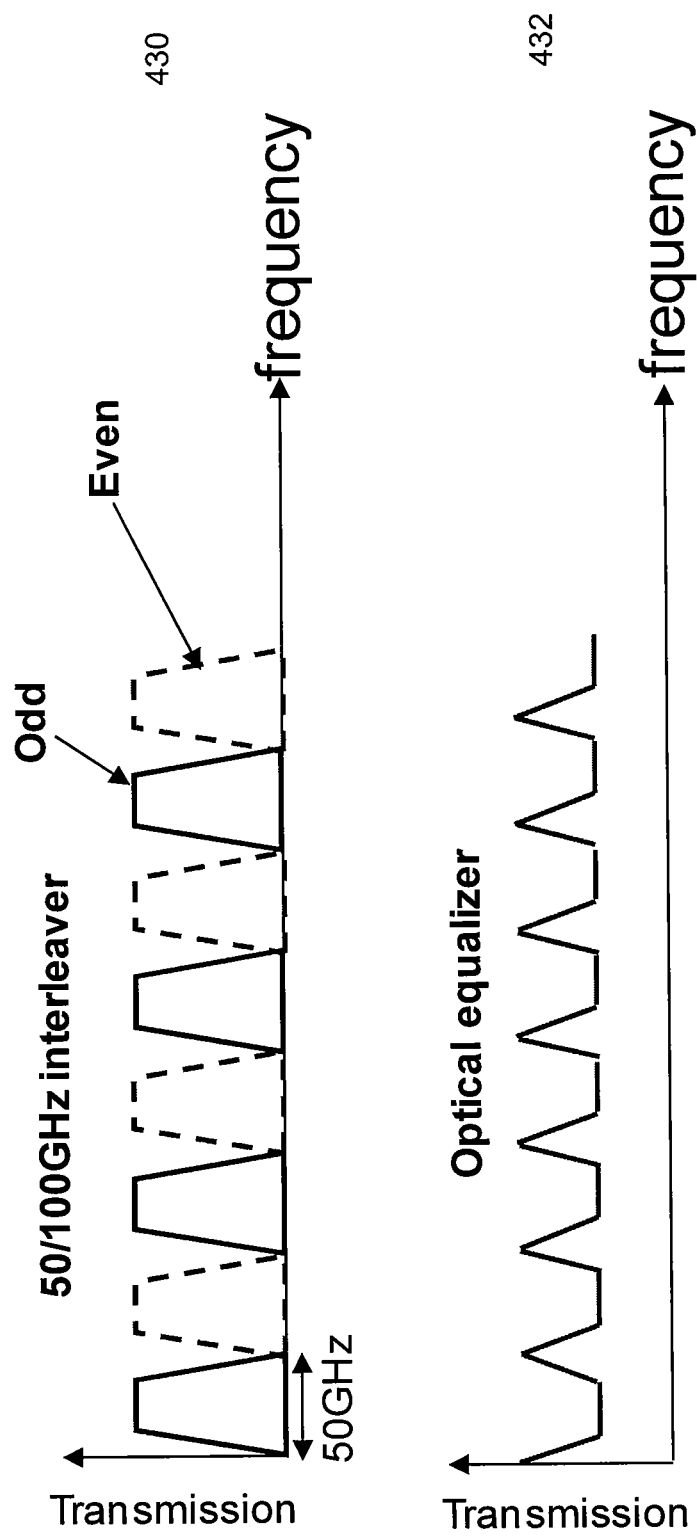
FIG. 4C illustrates an interleaver transmission spectra and an optical equalizer transmission spectra in accordance with an embodiment of the present disclosure.

FIG. 4C illustrates an interleaver transmission spectra and an optical equalizer transmission spectra in accordance with an embodiment of the present disclosure. Graph 430 illustrates the transmission spectra of an interleaver, for example, interleaver 404. Graph 432 illustrates the transmission spectra of an optical equalizer that compensates for optical filtering effects of the interleaver. In this particular illustration, graph 432 illustrates the transmission spectra of optical equalizer 402, which compensates for the optical filtering effects caused by interleaver 404.

Figure 5:
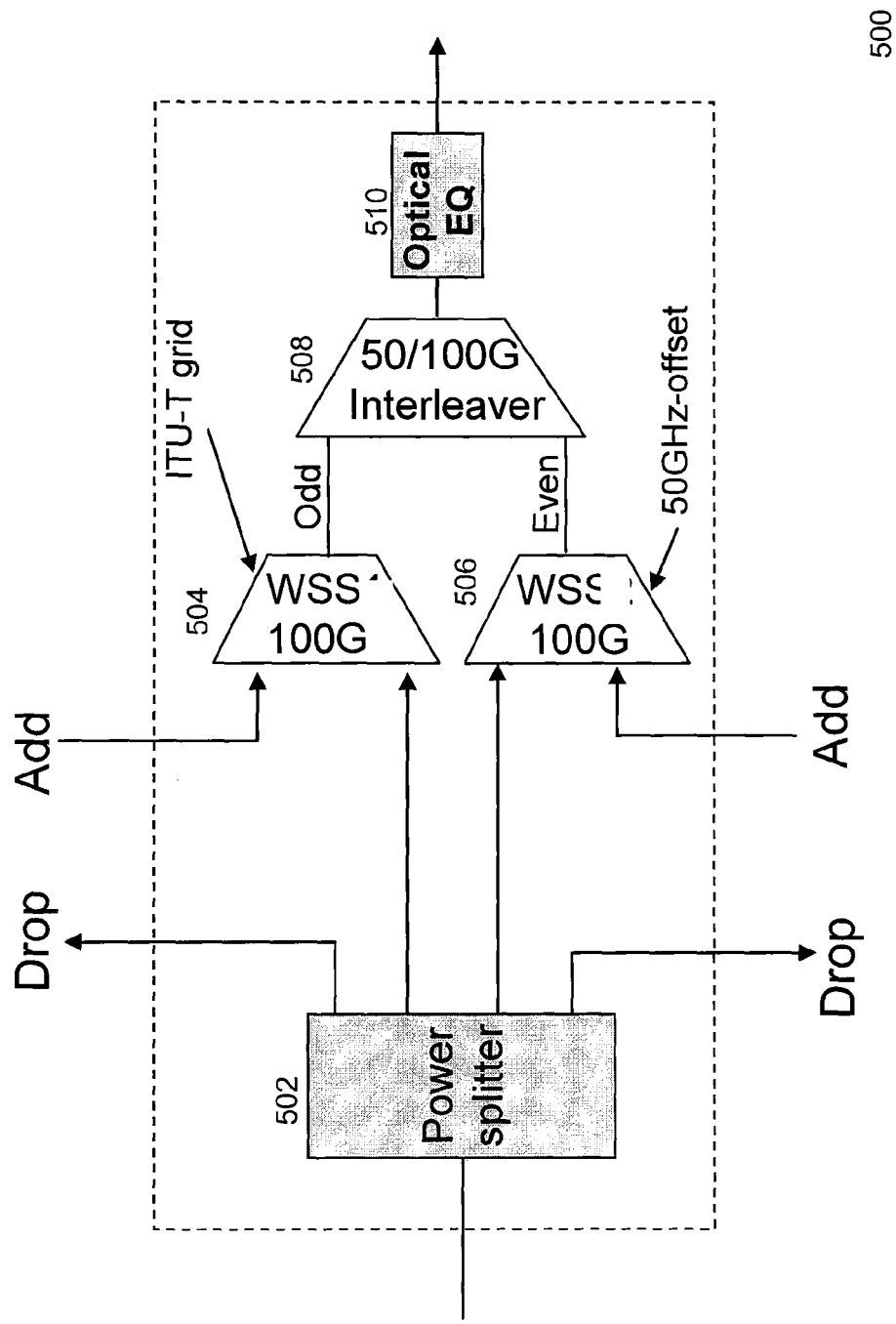
FIG. 5 illustrates an exemplary broadcast-and-elect ROADM 500, in accordance with an embodiment of the present disclosure.

FIG. 5 illustrates an exemplary broadcast-and-elect ROADM 500, in accordance with an embodiment of the present disclosure. In ROADM 500, an incoming optical signal, for example, a WDM signal, is split into two identical optical signals which are transmitted to two different WSS'. For example, power splitter 502 receives an optical signal and splits the optical signal into two identical optical signals. A first one of the split optical signals is transmitted to WSS 504 and a second one of the split optical signals is transmitted to WSS 506. The characteristics of WSS' 504 and 506 are similar to that of WSS' 410 and 412, described above with respect to FIG. 4A. Thus, WSS 504 facilitates switching or filtering of odd WDM optical signals from the optical signal to produce an odd optical signal and WSS 506 facilitates switching or filtering of even WDM optical signals to produce an even optical signal. Specifically, WSS 504 filters out even WDM wavelengths from the optical signal to produce an odd optical signal. Likewise, WSS 506 filters out odd WDM wavelengths from the optical signal to produce an even optical signal.

Interleaver 508 combines the odd optical signal and the even optical signal received from WSS' 504 and 506. Interleaver 508 may have characteristics of or be identical to interleaver 414, described above. Thus, interleaver 508 may be a 2×1 interleaver that produces a combined optical signal from the odd optical signal and the even optical signal.

The combined optical signal from interleaver 508 is then transmitted to optical equalizer 510 which compensates for optical filtering effects caused by interleaver 508, and WSS' 504 and 506, to produce a compensated optical signal. Specifically, optical equalizer 510 precompensates for optical filtering effects by equalizing the combined optical signal to mitigate optical filtering effects. Optical equalizer 510 may have characteristics of optical equalizer 402, described above. Thus, optical equalizer 510 may be a comb filter type static optical equalizer, such as the Fabry-Perot type comb filter.

Figure 6:
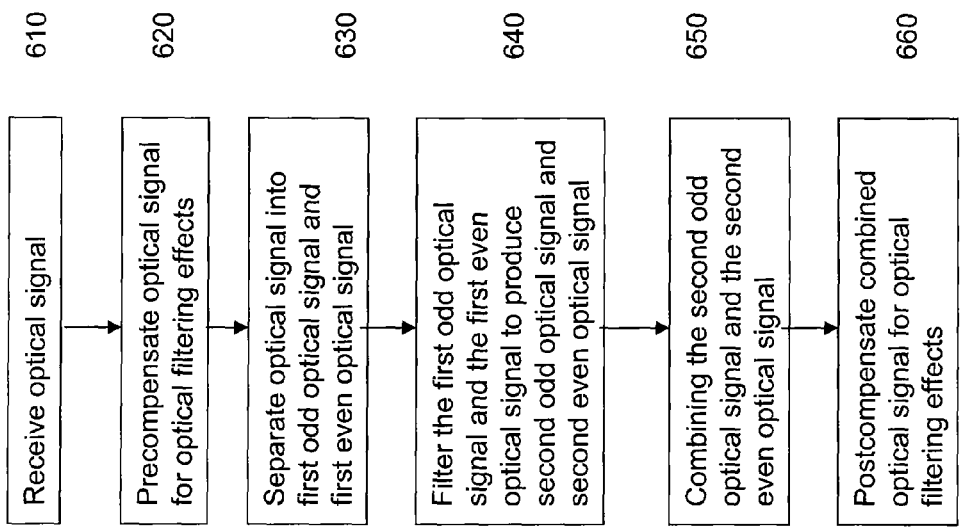
FIG. 6 illustrates an exemplary method 600 carried out by ROADM 400, in accordance with an embodiment of the present disclosure.

FIG. 6 illustrates an exemplary method 600 carried out by ROADM 400, in accordance with an embodiment of the present disclosure. At step 610, an optical signal is received at a ROADM, at an optical equalizer. For example, at ROADM 400, an optical signal is received at optical equalizer 402.

At step 620, an optical equalizer precompensates for optical filtering effects. Precompensation is performed by equalizing the optical signal, which mitigates the optical filtering effects of an associated interleaver and WSS', in order to produce an equalized optical signal. For example, optical equalizer 406 may precompensate the received optical signal to produce a compensated optical signal to equalize the optical signal for the optical filtering effects of interleaver 404 and WSS' 406 and 408. Equalization of the optical signal may include adjusting a frequency strength of the optical signal as well as reducing noise degradation of the optical equalizer itself.

At step 630, the compensated optical signal is separated into a first odd optical signal and a first even optical signal by an interleaver. For example, interleaver 404 receives the compensated optical signal and separates the compensated optical signal into an odd optical signal for transmission to WSS 406 and an even optical signal for transmission to WSS 408.

At step 640, the first odd optical signal and the first even optical signal are filtered by their respective WSS' to produce a second odd optical signal and a second even optical signal, respectively. For example, WSS 406 filters the odd optical signal based on optical wavelengths added to the odd optical signal and WSS 410 filters the odd optical signals based on optical wavelengths dropped from the odd optical signal to produce a filtered odd optical signal. WSS 408 filters the even optical signal based on optical wavelengths added to the even optical signal and WSS 412 filters the even optical signal based on optical wavelengths dropped from the even optical signal to produce a filtered even optical signal.

At step 650, the second odd optical signal and the second even optical signal are combined. For example, interleaver 414 combines the second odd optical signal and the second even optical signal.

At step 660, the combined optical signal is postcompensated by an optical equalizer to produce an output optical signal. For example, optical equalizer 416 postcompensates the combined optical signal to equalize the combined optical signal for the optical filtering effects of interleaver 414 and WSS' 410 and 412.

Figure 7:
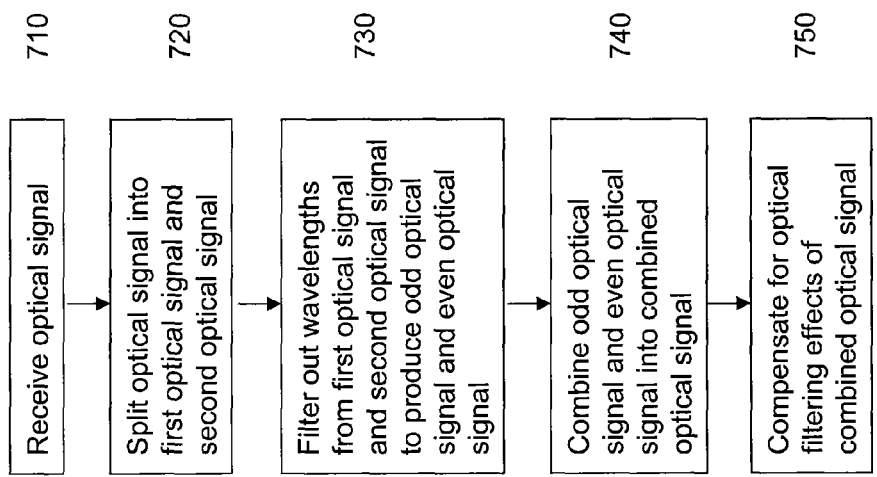
FIG. 7 illustrates an exemplary method 700 carried out by ROADM 500, in accordance with an embodiment of the present disclosure.

FIG. 7 illustrates an exemplary method 700 carried out by ROADM 500, in accordance with an embodiment of the present disclosure. At step 710, ROADM 500 receives an optical signal at a power splitter. For example, power splitter 502 receives an optical signal.

At step 720, the power splitter splits the received optical signal into a first optical signal and a second optical signal. For example, power splitter 502 splits the received optical signal into a first optical signal which is transmitted to WSS 504 and a second optical signal which is transmitted to WSS 506.

At step 730, the WSS' filter odd wavelengths and even wavelengths, respectively, to produce an odd optical signal and an even optical signal. For example, WSS 504 filters out even wavelengths from the first optical signal to produce an odd optical signal and WSS 506 filters out odd wavelengths from the second optical signal to produce an even optical signal.

At step 740, the odd optical signal and even optical signal are combined into a combined optical signal. For example, interleaver 508 combines the odd optical signal from WSS 504 and the even optical signal from WSS 506 to produce a combined optical signal.

At step 750, an optical equalizer compensates for optical filtering effects of the combined optical signal to produce an output optical signal. For example, optical equalizer 510 compensates for optical filtering effects caused by interleaver 508 and WSS' 504 and 508 in order to produce an output optical signal. Specifically, optical equalizer 510 equalizes the combined optical signal in order to produce the output optical signal.

It should be noted that the methods described herein may be used together with common transmitter-side pre-equalization techniques and/or receiver-side post-equalization techniques. The methods described herein may be used in order to compensate for first-order optical filtering effects while common transmitter-side pre-equalization techniques and/or receiver-side post-equalization techniques may be used to compensate for residual or high-order optical filtering effects.

The embodiments described herein for using optical equalizers integrated within ROADMs facilitates significant improvements to effective channel bandwidth. Theoretically, bandwidth may be utilized at a close to 100% bandwidth utilization rate as compared to current implementations of ROADMs which have a 50-70% bandwidth utilization rate. Additionally, there is no additional introduction of nonlinear penalty, or any significant noise enhancement. The achievable spectral efficiency may be improved, as well as single fiber capacity. This is particularly advantageous for long-haul and metropolitan optical networks where each optical wavelength of an optical signal must typically pass through multiple ROADMs. Cost per bit transmitted will be reduced and transport economics will be improved.

The foregoing Detailed Description is to be understood as being in every respect illustrative and exemplary, but not restrictive, and the scope of the embodiments disclosed herein is not to be determined from the Detailed Description, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of the present disclosure.

I claim:

1. A reconfigurable optical add-drop multiplexer comprising:
a first optical equalizer to precompensate a received optical signal for optical filtering effects to produce a first compensated optical signal;
a first interleaver, coupled to the first optical equalizer, to separate the first compensated optical signal into a first odd optical signal and a first even optical signal, wherein the first optical equalizer precompensates for optical filtering effects caused by the first interleaver;
a first odd wavelength selective switch, coupled to the first interleaver, configured to receive the first odd optical signal and generate a second odd optical signal;
a first even wavelength selective switch, coupled to the first interleaver, configured to receive the first even optical signal and generate a second even optical signal;
a second odd wavelength selective switch, coupled to the first odd wavelength selective switch, to receive the second odd optical signal from the first odd wavelength selective switch and generate a third odd optical signal;
a second even wavelength selective switch, coupled to the first even wavelength selective switch to receive the second even optical signal from the first even wavelength selective switch and generate a third even optical signal;
a second interleaver, coupled to the second odd wavelength selective switch and the second even wavelength selective switch, to combine the third odd optical signal and the third even optical signal to produce a combined optical signal; and
a second optical equalizer, coupled to the second interleaver, to postcompensate the combined optical signal for optical filtering effects to produce an output optical signal, wherein the second optical equalizer postcompensates for optical filtering effects caused by the second interleaver.

2. The reconfigurable optical add-drop multiplexer of claim 1, wherein:
the first interleaver is a 50/100 GHz 1×2 interleaver that separates the first compensated optical signal into two 100 GHz spaced wavelength division multiplexing signals representing the first odd optical signal and the first even optical signal; and
the second interleaver is a 50/100 GHz 1×2 interleaver that combines the third odd optical signal and the third even optical signal into a 50 GHz-spaced wavelength division multiplexing signal.

3. The reconfigurable optical add-drop multiplexer of claim 1, wherein:
the first odd wavelength selective switch includes a 50 GHz offset at an odd passband center to receive the first odd optical signal; and
the first even wavelength selective switch includes a 50 GHz offset at an even passband center to receive the first even optical signal.

4. The reconfigurable optical add-drop multiplexer of claim 1, wherein the first optical equalizer and the second optical equalizer are each a Fabry-Perot type comb filter.

5. The reconfigurable optical add-drop multiplexer of claim 1, wherein the first odd wavelength selective switch, the first even wavelength selective switch, the second odd wavelength selective switch, and the second even wavelength selective switch each comprises:
an add port, coupled to an input, configured to receive optical signal wavelengths;
a drop port, coupled to a first output, configured to drop optical signal wavelengths; and
a through port, coupled to a second output, to transmit an optical signal to a component of the reconfigurable optical add-drop multiplexer.

6. A method, comprising:
precompensating an optical signal for optical filtering effects to produce a compensated optical signal, the precompensating comprising preequalizing the optical signal to remove optical filtering effects caused by a first interleaver;
separating, by the first interleaver, the compensated signal into a first odd optical signal and a first even optical signal;
filtering the first odd optical signal to produce a second odd optical signal;
filtering the first even optical signal to produce a second even optical signal;
combining, by a second interleaver, the second odd optical signal and the second even optical signal to produce a combined optical signal;
postcompensating the combined optical signal for optical filtering effects to produce an output optical signal, the postcompensating comprising postequalizing the combined optical signal to remove optical filtering effects caused by the second interleaver.

7. The method of claim 6, wherein filtering the first odd optical signal to produce a second odd optical signal comprises:
filtering optical wavelengths added to the first odd optical signal and optical wavelengths dropped from the first odd optical signal to produce a filtered odd optical signal.

8. The method of claim 6, wherein filtering the first even optical signal to produce a second even optical signal comprises:
filtering optical wavelengths added to the first even optical signal and optical wavelengths dropped from the first even optical signal to produce a filtered even optical signal.

9. The method of claim 6, wherein precompensating an optical signal for optical filtering effects to produce a compensated optical signal comprises:
   preequalizing the optical signal to remove optical filtering effects caused by wavelength selective switches associated with the first interleaver.

10. The method of claim 6, wherein the compensated signal is a 50 GHz spaced wavelength division multiplexing signal, and wherein separating the compensated signal into a first odd optical signal and a first even optical signal comprises:
    generating an odd 100 GHz-spaced wavelength division multiplexing signal representing odd wavelength division multiplexing channels; and
    generating an even 100 GHz-spaced wavelength division multiplexing signal representing even wavelength division multiplexing channels.

11. The method of claim 6, wherein combining the second odd optical signal and the second even optical signal to produce a combined optical signal comprises:
    combining an odd 100 GHz-spaced wavelength division multiplexing signal representing odd wavelength division multiplexing channels and an even 100 GHz-spaced wavelength division multiplexing signal representing even wavelength division multiplexing channels to produce a combined 50 GHz spaced wavelength division multiplexing signal.

12. The method of claim 6, wherein postcompensating the combined optical signal for optical filtering effects to produce an output optical signal comprises:
    postequalizing the combined optical signal to remove optical filtering effects caused by wavelength selective switches associated with the second interleaver.

\* \* \* \* \*